Dec. 16, 1969  D. SCIAKY  3,484,578

ELECTRIC WELDING MACHINE WITH ROTATING ARC

Filed Jan. 11, 1965  4 Sheets-Sheet 1

Inventor:
David Sciaky.
By Hume Green Clement & Hume
Attys.

Inventor.
David Sciaky.

By Hume, Groen, Clement & Hume
Attys.

Inventor
David Sciaky

Inventor.
David Sciaky.

United States Patent Office 3,484,578
Patented Dec. 16, 1969

3,484,578
ELECTRIC WELDING MACHINE WITH
ROTATING ARC
David Sciaky, Chicago, Ill., assignor to Welding
Research, Inc., Chicago, Ill., a corporation of
Illinois
Filed Jan. 11, 1965, Ser. No. 424,483
Int. Cl. B23k 9/00, 9/08, 11/04
U.S. Cl. 219—97                                    4 Claims

ABSTRACT OF THE DISCLOSURE

The present rotating arc welding machine employs an alternating current source with rectifier means interposed between the source and the workpieces and solenoids respectively. Also a programming device is employed in combination with electric means such as variable reactors for producing variations in the current supplied for producing the arc and for also varying the intensity of the current delivered to the solenoids.

---

The invention relates generally to arc welding machines, and has reference more particularly to an electric welding machine which will produce a rotating arc.

Rotating arc welding machines are well known, and such machines are presently in use and have been in use for some time. The rotating arc is obtained by a magnetic field produced, for example, by two solenoids, a solenoid being placed on each part to be welded and on respective sides of the weld line.

However, these known machines have several disadvantages. For example, the optimum welding current cannot be precisely repeated for each operation. This is a necessary requirement regardless of the metal used, if a weld is to qualify as a good weld under all specifications. Furthermore, in these known machines the electric arc is obtained by direct current which produces a heating on the anode different from that of the cathode. If alternating current is employed in producing the arc, this heating problem is avoided. However, when employing alternating current, it is more difficult to obtain an even rotation of the arc, and thus an even heating all along the weld line.

The present invention provides a remedy for the above mentioned difficulties as regards rotating arc welding machines by incorporating in such machines means for the formation of an electric arc in the weld area of the parts to be welded, as well as means to produce a magnetic field to cause rotation of the arc. The basic feature of the welding machine of the invention is a programming device connected to at least one of the parts to be welded for modifying and controlling the electric arc and the spacing between the parts being welded to thereby obtain a good quality weld, and which can be repeated again and again with the same satisfactory results.

Another and more specific object of the invention resides in the provision of a programming device for a rotating arc welding machine wherein the said device is connected to the arc producing current so as to produce variations in the intensity of the arc during welding. Thus it is possible by means of the programming device to vary the intensity of the arc to accord with the size and nature of the parts to be welded, or with any other parameter of the said parts whereby to obtain welds of good quality.

Another objective of the invention is to provide a programming device of the character described which will produce an arc of square wave shape and which will have short reversing times.

With these and various other objects in view the invention may consist of certain novel features of construction and operation as will be more fully described and particularly pointed out in the specification, drawings and claims appended thereto.

In the drawings which illustrate an embodiment of the device and wherein like reference characters are used to designate like parts:

Figure 1:
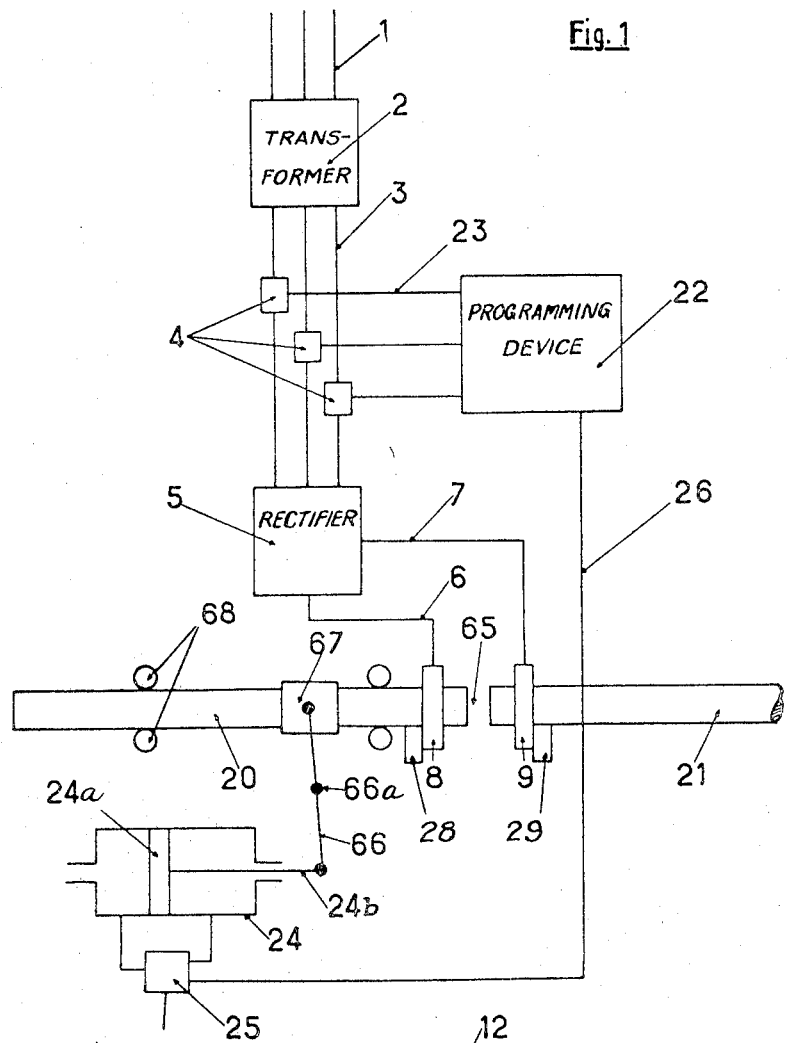
FIGURE 1 is a schematic wiring diagram illustrating one form of apparatus producing a rotating arc for welding purposes in accordance with the invention.

The welding apparatus disclosed in FIGURE 1 essentially consists of a three phase alternating current supply system indicated by numeral 1 which supplies the primary winding, not shown, of a transformer indicated by numeral 2. The secondary winding, not shown, of this transformer is electrically connected by the conductors 3 to a rectifier 5. The numeral 4 indicates variable reactors or inductance on the order of transducers, one being interposed, respectively in each phase of the supply system. The direct current obtained in the output of the rectifier 5 is supplied by the conductors 6 and 7 to the solenoids 8 and 9. The solenoids are located in telescoping relation with the parts to be welded, namely the parts 20 and 21. Accordingly, the solenoid 8, which is electrically connected by conductor 6, is located adjacent the right hand end of the part 20. In a similar manner the solenoid having connection with conductor 7 is located adjacent the left hand end of the part 21. Accordingly, it will be observed that the solenoids 8 and 9 are located on respective sides of the weld area indicated by numeral 65. The conductors 6 and 7 in addition to being connected to the solenoids 8 and 9 are also electrically connected to the parts 20 and 21, respectively, by the conductors 28 and 29.

The connection is such that an electric arc is produced in the weld area 65, which in turn heats the adjacent end portions of the parts so that when the parts in said heated condition are caused to contact each other, a welding of the same takes place. As a result of the magnetic field created by the solenoids 8 and 9, the electric arc is caused to rotate in a uniform and continuous manner and accordingly a uniform heating of the area of the parts to be welded takes place.

According to the present invention the welding apparatus as shown in FIGURE 1 is provided with a programming device indicated by numeral 22. The said programming device 22 may consist of an electronic sequencing mechanism, or the same may comprise an electromagnetic sequencing mechanism. The sequencing functions thus obtained by the programming device 22 renders it possible to obtain operating cycles having predetermined characteristics. The said characteristics are predetermined in accordance with certain parameters which, in turn, must be given consideration and provided for in order to secure a weld of the highest quality. The more important parameters comprise the size and shape of the parts to be welded and the particular metal of which the said parts are made.

The programming device 22 is electrically connected by the circuits 23 to the variable reactors 4. The variable reactors are at all times under the control of the programming device, and in accordance with the sequencing as determined by the said device the variable reactors 4 are influenced so as to modify the intensity of the current being delivered by the circuits 3 to the rectifier 5. Any variation in the intensity of the current supplied to the rectifier 5 will produce similar variations in intensity as regards the direct current supplied by the conductors 6 and 7. Thus the intensity of the arc produced in the weld area 65 is accordingly varied for each welding operation, as is also the magnetic field produced by the solenoids 8 and 9 which causes rotation of the arc.

The programming device 22 is also electrically connected by the conductor 26 to an electromagnetic valve 25. Any variation caused by the sequencing device 22 with respect to the current supplied to the electromagnetic valve 25 will cause the fluid under pressure within the cylinder 24 to flow to one side or the other of the piston 24a mounted within and adapted to reciprocate within the cylinder 24. The piston rod 24b is connected at its exterior end to the pivoted rod 66 which is pivoted to a fixed support at 66a. The upper end of the rod is pivotally connected to the part 20 to be welded by means of a ring or a clamping collar 67. Furthermore, it will be observed that the part 20 is mounted on rollers or on pulleys such as 68 so that the part is free to move in a longitudinal direction towards and from the part 21. Actuation of the piston 24a will oscillate the rod 66 and in accordance with the invention the programming device will effect the desired movement of the part 20 during the welding operation. The parts to be welded such as those identified by the numeral 20 and 21 may comprise a solid rod of circular, square or octagonal shape, or the parts may comprise a tube or similar workpieces having the same or dissimilar shapes and which may consist of the same or dissimilar metals.

An important feature of this invention is that the intensity of the current generating the electric arc for the welding operation is controlled in a way as to fulfill essential conditions for obtaining a good quality weld. It was thus discovered that at the time of formation of the arc, that is, at the start of the welding operation, the intensity of the arc generating current should be maintained at a relatively low value in order to avoid the formation of a crater on the parts to be welded. It was further discovered that this low value in the arc generating current should be maintained until the magnetic field produced by the solenoids 8 and 9 causes rotation of the arc. An additional factor was also observed, namely that when the parts to be welded reach the welding temperature and the same are at the closest distance from each other, it is desirable to increase the intensity of the current generating the arc in order to compensate for the reduction of power in the arc which results from the greatly shortened gap between the parts.

Figure 2:
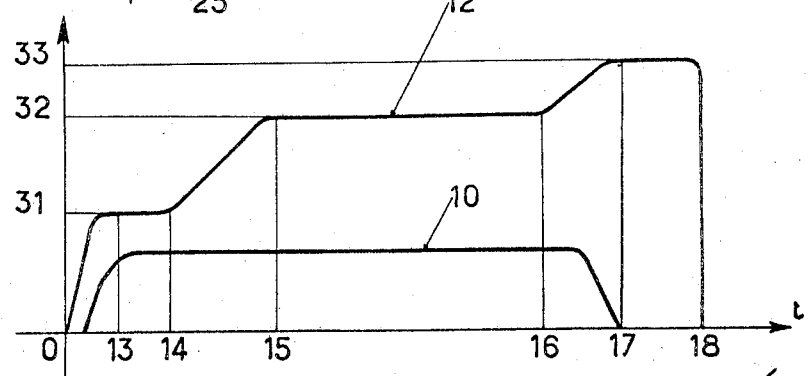
FIGURE 2 is a chart showing variations in the arc producing current in relation to variations in the spacing of the parts being welded as regards the apparatus of FIGURE 1.

Since the programming device 22 acts simultaneously on the intensity of the arc producing current and on the magnetic field, as well as on the physical movement of the parts being welded, the said device can therefore be set up in a manner to automatically produce a programming such as the one illustrated in FIGURE 2 and which will now be described.

In said figure the welding times are indicated on the horizontal axis and the variations in the intensity of the current producing the arc is shown on the vertical axis. The curve 10 shows the variations in the distance between the two parts 20 and 21 during a welding operation, whereas the curve 12 shows the variations in the intensity of the direct current produced by the rectifier 5.

In advance of the welding operation and until time zero is reached the two parts 20 and 21 to be welded are in contact with each other and the intensity of the current supplied by the rectifier 5 is nil. At the start of the welding operation the sequencing device 22 first controls the current established between the parts and then effects a controlling function over the electromagnetic valve 25. The parts 20 and 21 are caused to separate by right hand movement of the piston 24a within the cylinder 24 and an arc is accordingly established between the separating surfaces of the two parts. Beginning with time 13 and continuing to time 14, the intensity of the arc is limited to a value 31 which is relatively low in order to avoid the formation of craters on either of the parts. This low value for the arc producing current is maintained until the magnetic field produced by the solenoids 8 and 9 causes the arc to rotate. Accordingly from time 14 to time 15 the value of the current for producing the arc will increase and eventually a value 32 will be reached. The intensity of the current remains substantially constant from 15 through to time 16. When time 16 is reached the heating of the parts by the arc to the desired temperature has taken place and contact of the parts for effecting a weld is next in order. Thus assuming that the parts to be welded reach a weld temperature at time 16, then the programming device 22 will produce a functioning of the electrode valve 25 at this time to cause the piston 24a to travel to the left. This moves part 20 toward part 21 and eventually causes their physical contact and the eventual welding of the parts together. However, during the time the programming device brings the parts closer together, and eventually into contact, it also acts on the variable reactors 4 in such a manner as to increase the intensity of the arc producing current to a value such as represented by the numeral 33. This action is necessary in order to compensate for the power reduction in the arc caused by the closeness of the parts. At time 18 which may be immediately after the parts come into contact with each other or a short interval of time thereafter, the weld current is completely cut off by the programming device, and since the device has now completed one welding operation, its sequencing mechanism is in position for initating another welding operation.

A further improvement contemplated by the invention and relating to welding machines which employ a rotating arc, resides in the provision of means for shaping the arc-producing current so that the same will have a square wave shape with a very brief reversing time between alternating cycles. This is an improvement over the use of direct current since it is possible to create the same degree of heat on both of the parts to be welded and at the same time obtain a uniform rotation of the arc. In addition, the frequency of the square wave current can be adjusted so as to obtain the proper frequency for any particular welding operation. Variations in frequency of the arc producing current during the welding operation can be obtained by adjusting the programming device 22. One form of such apparatus is disclosed in FIGURE 3. The alternating current supply source identified by numeral 1 may be either single phase or three phase. In either event, alternating current of the standard frequency is supplied to the rectifiers 41 and 42. The programming device 22 is electrically connected to each of the rectifiers by the circuits 23. The rectifiers 41 and 42 are electrically connected in opposition, and it will be understood that the said rectifiers are controlled alternately by the said programming means. The square wave current from the rectifiers is supplied by the conductors 43 and 44 to the solenoids 8 and 9, respectively. Solenoid 8 is electrically connected by conductor 28 to the part 20 and in a similar manner solenoid 9 is electrically connected by the conductor 29 to the part 21.

Figure 4:
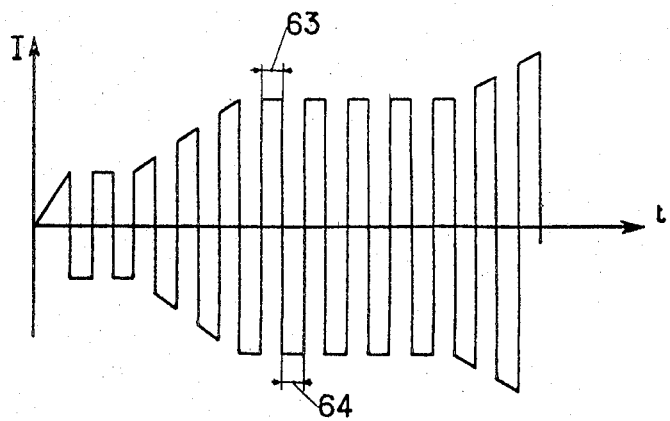
FIGURE 4 is a diagram showing the current generating the arc and also showing the magnetic field as produced by the apparatus of FIGURE 3.

A square wave alternating current such as supplied by the rectifiers 41 and 42 to the solenoids 8 and 9 is diagrammatically illustrated in FIGURE 4. The positive half cycles are numbered 63, with numeral 64 indicating the negative half cycles. In this embodiment it will be understood that the intensity of the square wave current varies and that such variations can be obtained by the programming device. Thus it is possible to predetermine this characteristic of the arc-producing current for each welding operation so as to secure the best results.

Figure 3:
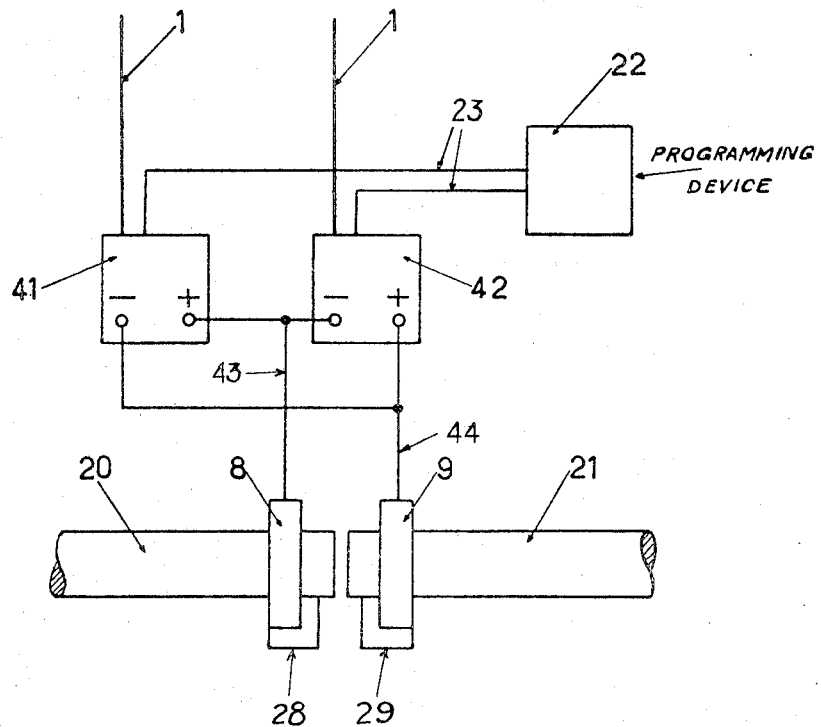
FIGURE 3 is another schematic wiring diagram illustrating a modification of a rotating arc welding machine coming within the invention.
Figure 5:
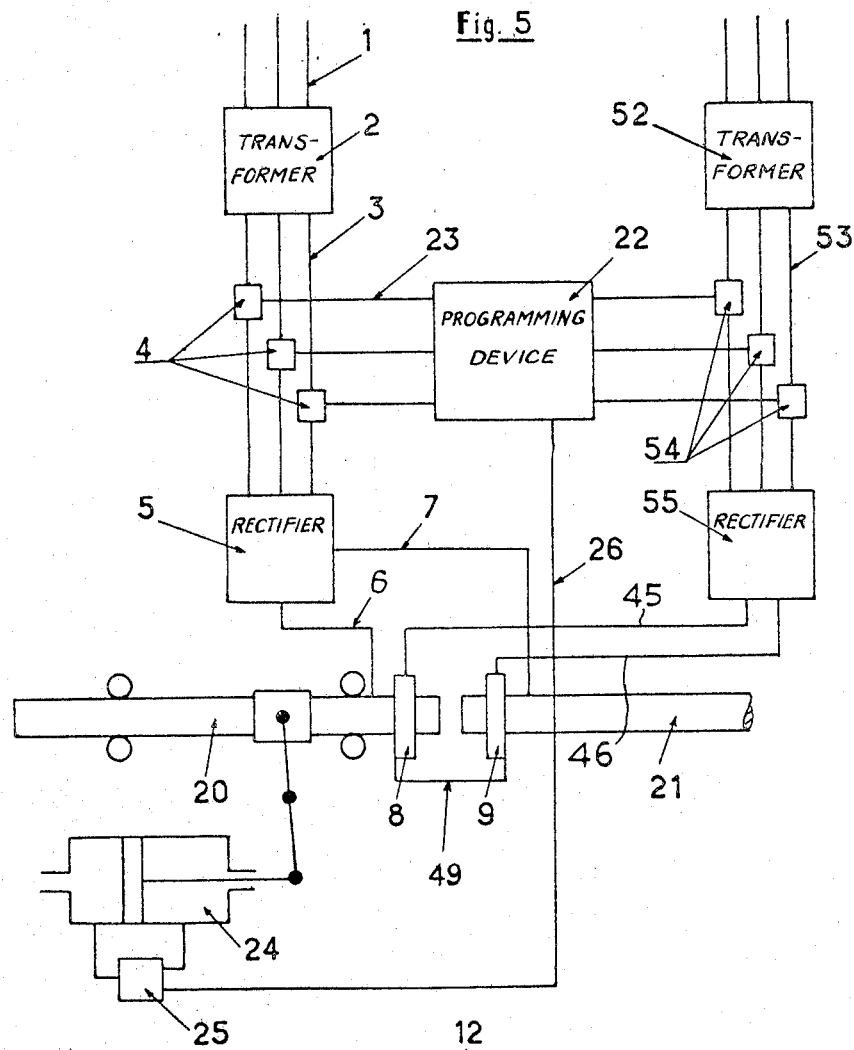
FIGURE 5 is a schematic wiring diagram showing still another modification of a rotating arc welding machine coming within the invention.

In the modifications of FIGURES 1 and 3, the solenoids 8 and 9 which produce the magnetic field are electrically connected in series with the parts to be welded. It is possible to construct welding machines wherein the solenoids will be supplied with electric power from a source different from the source supplying the arc. With apparatus of this nature it is possible to select a setting for the arc producing current which is separate and which may be different from the setting for the current producing the magnetic field. FIGURE 5 illustrates a welding machine of this type. The apparatus shown in said figure is similar to that of FIGURE 1 except for the addition of a second transformer 52 which is supplied with electrical energy from the three phase source 1 in a manner identical with that as described for transformer 2. A circuit 53 for each phase connects the secondary winding of transformer 52 with the rectifier 55 and as regards each phase a variable reactor 54 is interposed in the same. The variable reactors 54 are controlled by the programming device 22 and accordingly it will be understood that the apparatus is similar and has a similar mode of operation to that as described for FIGURE 1. However, in the apparatus of FIGURE 5 the conductors 6 and 7 are electrically connected directly to the parts to be welded, whereas in FIGURE 1 the conductors are electrically connected to the solenoids 8 and 9, and the solenoids are in turn connected to the work pieces. Referring again to FIGURE 5 it will be observed that the rectifier 55 by means of the conductors 45 and 46 is electrically connected to the solenoids 8 and 9. Thus in this circuit the solenoids are supplied with electrical energy from a source different from that producing the arc.

Figure 6:
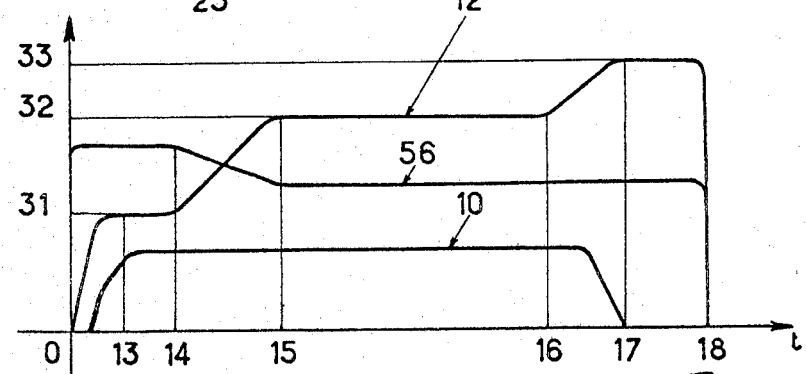
FIGURE 6 is a chart illustrating certain variable factors taking place during a welding operation as regards the apparatus of FIGURE 5, the same including the variations in the arc producing current, the variations in the current generating the magnetic field, and the variations in the spacing of the parts being welded.

FIGURE 6 illustrates in diagrammatic form a typical programming such as may be obtained with the apparatus of FIGURE 5. As previously explained in connection with FIGURE 2, the curve 10 represents the spacing of the parts being welded and curve 12 represents the variations in the intensity of the arc generating current with respect thereto. However, a third curve, namely 56, has been added to this chart, the same representing the variations in the current supplied by rectifier 55 to the solenoids 8 and 9. According to curve 56 it will be seen that the intensity of the current delivered to the solenoids between times zero and 14, that is, at the start of the welding operation, is higher than during the remainder of the welding operation. This higher current supplied to the solenoids at the start increases the value of the magnetic field and thus is desirable in order to initially induce rotation of the arc. However, immediately upon the formation of the arc, the value of the current supplied to the solenoids is reduced in order to avoid the production of craters in the parts being welded. The apparatus of FIGURE 5 has a further advantage in that the rotation of the arc during the welding operation can be either accelerated or slowed down. This is made possible by the fact that the system for adjusting the magnetic field is separated and independent from the system which supplies the arc-producing current.

Figure 7:
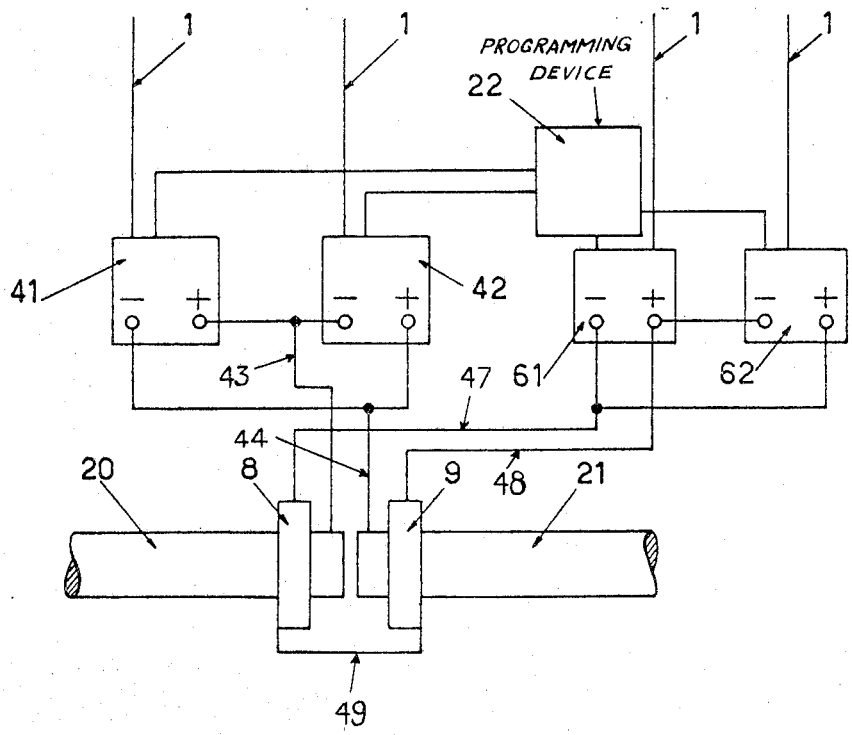
FIGURE 7 is a schematic wiring diagram illustrating another modification of a rotating arc welding machine coming within the invention.
Figure 8:
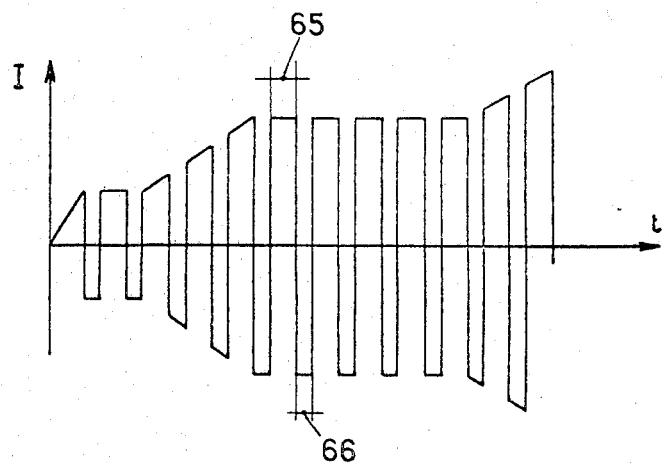
FIGURE 8 is a diagram showing the current generating the arc and also showing the magnetic field as produced by the apparatus of FIGURE 7.

In the third modification of the invention which is shown in FIGURE 7, the apparatus is substantially similar to that as shown in FIGURE 3 except for the fact that the circuit incorporates two additional rectifiers 61 and 62 which are controlled by the programming device 22. The said programming device also controls the rectifiers 41 and 42. Both sets of rectifiers, namely 41, 42 and 61, 62 are electrically connected in opposition, and the rectifiers of each set are controlled alternately by the programming device. The output from the rectifiers 41, 42 is delivered by the conductors 43 and 44 to the workpieces being welded. In a similar manner the output from the rectifiers 61, 62 is delivered by the conductors 47, 48 to the solenoids 8 and 9. The said solenoids are connected in series by the conductor 49. The square wave current as produced by the programming device may have positive and negative cycles 63 and 64 which will be precisely equal as shown in FIGURE 4. This form of current is best suited for the welding of parts which are symmetrical. However, it is possible with the apparatus of FIGURE 7 to supply an arc having a greater heating effect to one or the other of the parts being welded. For this purpose it is only necessary to adjust the programming device so that the positive cycles 65 as shown in FIGURE 8 may have a longer duration than the negative cycles identified by the numeral 66. By supplying the positive half cycles 65 to the part 20 for example, the heating of this part can be increased over that of part 21. Such action of the rectifiers 41 and 42 is desirable in the event the parts being welded are not the same size or are non-symmetrical as regards shape.

In the apparatus of FIGURE 1 the output terminals 6 and 7 of the rectifier 5 are connected to one terminal respectively of the solenoids 8 and 9. The conductors 28 and 29 connect the other terminal of the solenoids respectively, with its particular work piece. A similar connection for the same parts is employed in the apparatus of FIGURE 3. However, in FIGURES 5 and 7 the conductor 49 connects the solenoids 8 and 9 in a series circuit relation with the terminals of the rectifier supplying the current producing the magnetic field.

The variable reactors 4 may be either completely electrical in character or said devices may be electro-mechanical. For example, a saturated reactor can be employed. In devices of this character the reactance is varied by means of a low level direct current signal which in this case would be obtained from the programming device. The electro-mechanical variable reactor would be operated by a motor or solenoid whose position can in turn be controlled from a signal taken from the programming device.

The invention is not to be limited to or by details of construction of the particular embodiment thereof illustrated by the drawings, as various other forms of the device will of course be apparent to those skilled in the art without departing from the spirit of the invention or the scope of the claims.

What is claimed is:

1. In apparatus for arc welding wherein the arc rotates circumferentially of the work pieces during the welding operation, the combination with a pair of solenoids located adjacent the weld area and having telescoping relation with the work pieces respectively, of circuit means connecting with a source of power and having connection respectively with the solenoids and with the work pieces, one terminal of the circuit means having connection with one terminal of one of the solenoids and another terminal of the circuit means having connection with one terminal of the other solenoid, whereby an electric arc is developed between the work pieces and which occupies the weld area and whereby the solenoids develop an electric field to cause rotation of the arc circumferentially of the work pieces, electric means interposed in the circuit means between the source of power and the work pieces for controlling the intensity of the arc producing current, power mechanism for effecting movement of one work piece towards and from the other work piece to effect a spacing of the work pieces at the weld area, and a programming device having electrical connection with the electric means and with the power mechanism, said programming device during each welding operation controlling the electric means and the power mechanism so as to vary the spacing of the work pieces in a predetermined manner and so as to vary the intensity of the current supplied to the solenoids and to the work pieces in a manner to correlate the intensity with the spacing.

2. In apparatus for arc welding wherein the arc rotates circumferentially of the work pieces during the welding operation, the combination with a pair of solenoids located adjacent the weld area and having telescoping relation with the work pieces respectively, of a first rectifier connected at its input with a source of electrical power, a second rectifier also connected at its input with a source of electrical power, the output terminals of the first rectifier having connection with the work pieces respectively, the output terminals of the second rectifier having connection with the solenoids in series, whereby an electric arc is developed between the work pieces and which occupies the weld area and whereby the solenoids develop an electric field to cause rotation of the arc circumferentially of the work pieces, electric means interposed in the circuit between the source of power and each of the rectifiers for controlling the intensity of the arc producing current and the intensity of the current delivered to the solenoids, and a programming device having electrical connection with each electric means, said programming device during each welding operation controlling each electric means in such a manner as to vary the intensity of the currents delivered by the said rectifiers.

3. Apparatus for arc welding as defined by claim 2, wherein the programming device controls the electric means respectively so as to vary the intensity of the arc producing current in a manner different from the variations produced in the intensity of the current delivered to the solenoid.

4. Apparatus for arc welding as defined by claim 2, additionally including power mechanism for moving one work piece towards and from the other work piece for varying the spacing at the weld area, and a circuit connecting the power mechanism with the programming device, whereby the programming device controls the spacing of the work pieces in a manner correlated with the variations in the currents produced by the rectifiers.

References Cited

UNITED STATES PATENTS

| | | | |
|---|---|---|---|
| 2,477,582 | 8/1949 | Dawson | 219—97 |
| 2,488,899 | 11/1949 | Cooper et al. | 219—97 |
| 3,054,884 | 9/1962 | Manz et al. | 219—131 |
| 3,233,116 | 2/1966 | Watrous | 219—114 X |
| 3,330,933 | 7/1967 | Maklary | 219—131 |
| 2,862,114 | 11/1958 | Solomon. | |
| 2,602,155 | 7/1952 | Michelet. | |
| 2,455,526 | 12/1948 | Sciaky. | |

JOSEPH V. TRUHE, Primary Examiner

M. C. FLIESLER, Assistant Examiner

U.S. Cl. X.R.

219—123